C. HIGLEY.
Churn and Ice-Cream Freezer.
No. 79,349.
Patented June 30, 1868.
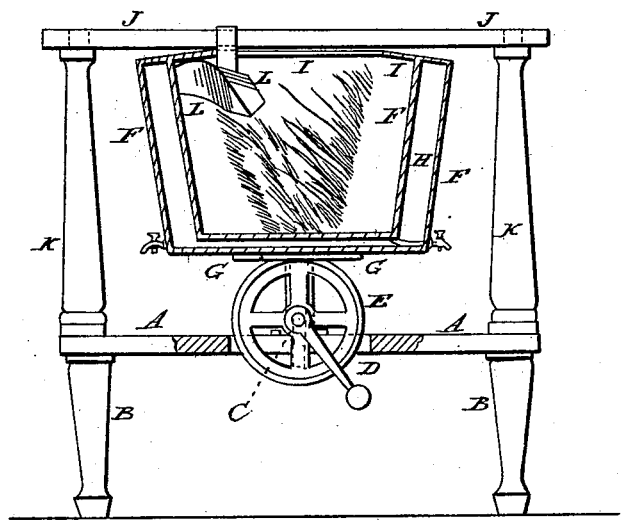
Witnesses:
Inventor:

United States Patent Office.

CHARLES HIGLEY, OF PORT BYRON, NEW YORK.

Letters Patent No. 79,349, dated June 30, 1868.

---

IMPROVEMENT IN CHURN AND ICE-CREAM FREEZER.

---

*The Schedule referred to in these Letters Patent and making part of the same.*

---

TO ALL WHOM IT MAY CONCERN:

Be it known that I, CHARLES HIGLEY, of Port Byron, in the county of Cayuga, and State of New York, have invented a new and improved Churn and Ice-Cream Freezer; and I do hereby declare that the following is a full, clear, and exact description thereof, which will enable others skilled in the art to make and use the same, reference being had to the accompanying drawings, forming part of this specification.

The figure is a vertical section of my improved machine.

My invention has for its object to furnish an improved machine, so constructed and arranged that it may be used with equal facility as a churn and as an ice-cream freezer, and which will do its work in either capacity more thoroughly and quickly than it can be done with the machines ordinarily used for these purposes; and it consists in the combination of the revolving double-walled receptacle and curved spout with each other, as hereinafter more fully described.

A is a platform, supported upon legs B, of such a length as to raise said platform to a convenient height. C is a shaft, revolving in bearings upon the platform A, and having a crank, D, attached to its outer end. E is a friction-wheel, attached to the inner end of the shaft C. F is the cream-receptacle, which is made in the form of an inverted truncated cone, as shown in the figure. The receptacle F is pivoted to and held in a vertical position above the platform A by a spindle attached to the centre of the bottom of said receptacle, and which passes through and revolves in bearings in a support attached to said platform. To the central part of the bottom of the receptacle F is secured a circular metallic disk or plate G, which rests upon the face of the friction-wheel E, so that the said receptacle may be revolved by the revolution of the said wheel. The side walls of the receptacle F are made double, as shown in the figure, so as to form a space or chamber, H, for the reception of warm or cold water, for the purpose of tempering the cream when churning, and for the reception of ice or freezing-mixtures for freezing the ice-cream.

The bottom of the receptacle F may also be made double if desired, forming a space or chamber continuous with the chamber H. I is a flange, attached to the upper edges of the side walls of the receptacle F, and projecting inward, as shown in the drawing, to prevent the contents of the receptacle from being thrown out by its rapid revolution. The water, ice, &c., are introduced into the chamber H through holes or openings in said flange. The buttermilk and contents of the chamber H may be drawn off by stop-cocks, as shown in red in the drawing. J is a cross-bar, extending across the central part of the top of the receptacle F, and the ends of which are removably attached to the upper ends of the posts K, the lower ends of which are attached to the platform A. From the cross-bar J is suspended a curved spout, L, in such a position as to take the cream, as it is spread over and rises along the sides of the receptacle F, and discharge it again upon the bottom of said receptacle, to be again raised by the centrifugal force engendered by the revolution of said receptacle.

I claim as new, and desire to secure by Letters Patent—

The receptacle F, constructed as described, with double walls and bottom, forming a water or ice-chamber, H, having no communication with the interior of the receptacle, and closed at the top by means of the annular flange I, beneath which, within the receptacle, upon one side, the curved spout L is suspended, as herein described, for the purpose specified.

The above specification of my invention signed by me, this first day of November, 1867.

CHARLES HIGLEY.

Witnesses:
ALEX. F. ROBERTS,
JAMES T. GRAHAM.